(12) United States Patent
Gong et al.

(10) Patent No.: US 10,532,949 B2
(45) Date of Patent: *Jan. 14, 2020

(54) ZR-BASED COMPOSITE CERAMIC MATERIAL, PREPARATION METHOD THEREOF, AND SHELL OR DECORATION

(71) Applicant: BYD COMPANY LIMITED, Shenzhen (CN)

(72) Inventors: Qing Gong, Shenzhen (CN); Xinping Lin, Shenzhen (CN); Ge Chen, Shenzhen (CN); Bo Wu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/775,104

(22) PCT Filed: Nov. 23, 2016

(86) PCT No.: PCT/CN2016/106864
§ 371 (c)(1),
(2) Date: May 10, 2018

(87) PCT Pub. No.: WO2017/092591
PCT Pub. Date: Jun. 8, 2017

(65) Prior Publication Data
US 2018/0327320 A1    Nov. 15, 2018

(30) Foreign Application Priority Data
Nov. 30, 2015  (CN) .......................... 2015 1 0861089

(51) Int. Cl.
*C04B 35/488* (2006.01)
*C04B 35/64* (2006.01)
(Continued)

(52) U.S. Cl.
CPC .......... *C04B 35/48* (2013.01); *C04B 35/6261* (2013.01); *C04B 35/62655* (2013.01);
(Continued)

(58) Field of Classification Search
CPC ................................................... C04B 35/488
See application file for complete search history.

(56) References Cited

U.S. PATENT DOCUMENTS

2018/0327321 A1\* 11/2018 Gong ..................... C04B 35/64

FOREIGN PATENT DOCUMENTS

| CN | 101439969 A | 5/2009 |
| CN | 101624285 A | 1/2010 |

(Continued)

OTHER PUBLICATIONS

The World Intellectual Property Organization (WIPO) International Search Report and Written Opinion for PCT/CN2016/106864 dated Dec. 28, 2016 7 Pages.

*Primary Examiner* — Karl E Group
(74) *Attorney, Agent, or Firm* — Anova Law Group, PLLC

(57) ABSTRACT

A Zr-based composite ceramic material, a preparation method thereof and a shell or a decoration are provided. The Zr-based composite ceramic material includes a zirconia matrix and a cubic $Sr_xNbO_3$ stable phase dispersed within the zirconia matrix, where $0.7 \leq x \leq 0.95$.

20 Claims, 1 Drawing Sheet

(51) Int. Cl.
*C04B 35/48* (2006.01)
*C04B 35/626* (2006.01)

(52) U.S. Cl.
CPC ...... *C04B 35/64* (2013.01); *C04B 2235/3246* (2013.01); *C04B 2235/3255* (2013.01); *C04B 2235/442* (2013.01); *C04B 2235/604* (2013.01); *C04B 2235/6567* (2013.01)

(56) References Cited

FOREIGN PATENT DOCUMENTS

| | | | |
|---|---|---|---|
| CN | 101857455 A | * | 10/2010 |
| CN | 102260078 A | | 11/2011 |
| CN | 102260079 A | | 11/2011 |
| JP | S59105055 A | | 6/1984 |

* cited by examiner

ZR-BASED COMPOSITE CERAMIC MATERIAL, PREPARATION METHOD THEREOF, AND SHELL OR DECORATION

CROSS-REFERENCE TO RELATED APPLICATION

This application is a national phase entry under 35 U.S.C. § 371 of International Application No. PCT/CN2016/106864, filed on Nov. 23, 2016, which claims priority to and benefits of Chinese Patent Application Serial No. 201510861089.5, filed with the State Intellectual Property Office (SIPO) of P. R. China on Nov. 30, 2015. The entire contents of the above mentioned applications are incorporated herein by reference.

FIELD

The present disclosure generally relates to a ceramic material and its application field, and especially to a Zr-based composite ceramic material, a preparation method thereof, and a shell or a decoration.

BACKGROUND

With highly development of science and technology, requirement for performance and quality of a ceramic material becomes higher and higher. A zirconia ceramic has a wide application due to their relatively better corrosion resistance, higher hardness and higher strength as compared to other ceramics. However, when manufactured to be an appearance parts having a large area, the current zirconia ceramic still has a poor drop resistance performance even though it has a relatively high tenacity (which may reach 5-6 $MPa \cdot m^{1/2}$) compared to other ceramics. Thus, there is still a need to improve the drop resistance performance of the zirconia ceramic when the zirconia ceramic is used to manufacture the appearance part.

SUMMARY

The present disclosure seeks to solve at least one of the technical problems in the related art to some extent. Therefore, the present disclosure provides a Zr-based composite ceramic material having a good drop resistance performance, a preparation method thereof, and a shell or a decoration.

According to a first aspect of the present disclosure, a Zr-based composite ceramic material is provided, the Zr-based composite ceramic material includes: a zirconia matrix and a cubic $Sr_xNbO_3$ stable phase dispersed within the zirconia matrix, where $0.7 \leq x \leq 0.95$.

According to a second aspect of the present disclosure, a method for preparing a Zr-based composite ceramic material is provided. The method includes: preparing a mixed slurry by mixing a zirconia powder, a $SrCO_3$ powder, a $Nb_2O_5$ powder and a binder; and obtaining the Zr-based composite ceramic material by drying, molding and sintering the mixed slurry in sequence, a molar ratio of the $SrCO_3$ powder to the $Nb_2O_5$ powder is 2x:1, where $0.7 \leq x \leq 0.95$.

According to a third aspect of the present disclosure, a Zr-based composite ceramic material prepared by the method mentioned above is provided.

According to a fourth aspect of the present disclosure, a shell or a decoration is provided. The shell or the decoration is made of any one of the Zr-based composite ceramic material mentioned above.

With the Zr-based composite ceramic material of the present disclosure, a tenacity and a drop resistance performance thereof may be effectively improved by dispersing a cubic $Sr_xNbO_3$ stable phase within the zirconia matrix, thus making it suitable to be used to manufacture an appearance part having a large area, such as a shell or a decoration.

Additional aspects and advantages of embodiments of present disclosure will be illustrated in detail in the following descriptions.

BRIEF DESCRIPTION OF THE DRAWINGS

The accompanying drawings, which constitute a part of this specification, serve to further illustrate and explain the principles of the invention together with the following embodiments, and shall not be construed to limit the present disclosure, in which.

DETAILED DESCRIPTION

Figure 1:
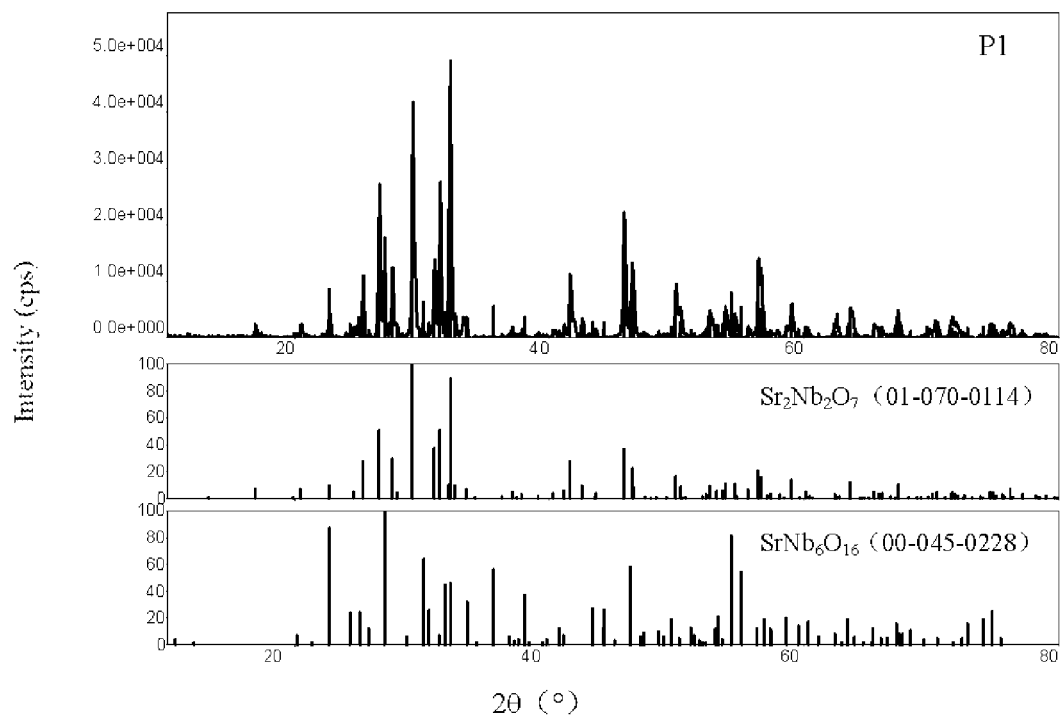
FIG. 1 is a diagram showing a XRD diffraction pattern of P1 prepared in Testifying Example 1 and standard cards of $SrNb_6O_{16}$ (00-045-0228) and $Sr_2Nb_2O_7$ (01-070-0114)

Embodiments of the present disclosure are described in detail below, and examples of the embodiments are shown in accompanying drawings. The following embodiments described by referring to the accompanying drawings are illustrative, aim at explaining the present disclosure, and should not be interpreted as limitations to the present disclosure.

Just as mentioned in the background, there is a need to further improve a drop resistance performance of the current zirconia ceramic. To this end, inventors of the present disclosure have done intensive researches on the zirconia ceramic, and provide a Zr-based composite ceramic material. The Zr-based composite ceramic material includes a zirconia matrix and a cubic $Sr_xNbO_3$ stable phase dispersed within the zirconia matrix (inside or on a surface thereof), where $0.7 \leq x \leq 0.95$.

In some embodiments of the present disclosure, $0.72 \leq x \leq 0.86$. In some embodiments, the cubic $Sr_xNbO_3$ stable phase has a lattice constant of 3.98 to 4.03 Å. In some embodiments, the cubic $Sr_xNbO_3$ stable phase is a cubic $Sr_{0.82}NbO_3$ stable phase (which has a lattice constant of 4.002 Å), a cubic $Sr_{0.72}NbO_3$ stable phase (which has a lattice constant of 3.9865 Å) or a cubic $Sr_{0.86}NbO_3$ stable phase (which has a lattice constant of 4.006 Å).

With the Zr-based composite ceramic material of the present disclosure, a tenacity and a drop resistance performance thereof may be effectively improved by dispersing a cubic $Sr_xNbO_3$ stable phase within the zirconia matrix (inside or on the surface thereof), thus making it suitable to be used to manufacture an appearance part having a large area, such as a shell or a decoration.

It should be noted that there is no particular limitation for the content of the cubic $Sr_xNbO_3$ stable phase, the tenacity of the Zr-based composite ceramic material may be regulated to some extent as long as the zirconia matrix contains the cubic $Sr_xNbO_3$ stable phase described above. It should also be noted that a content of the cubic $Sr_xNbO_3$ stable phase may be regulated by those skilled in the art according to a common content of auxiliary material used for regulating the tenacity of ceramic material in the art.

In some embodiments, a content of the cubic $Sr_xNbO_3$ stable phase in the Zr-based composite ceramic material is in a range of about 0.2 mol % to about 8 mol %, based on 100 mol % of zirconia powder. For example, based on 100 mol % of the zirconia matrix, the Zr-based composite ceramic material includes about 1 mol % to about 6.1 mol % of the cubic $Sr_xNbO_3$ stable phase. Within above content range of the cubic $Sr_xNbO_3$ stable phase, the tenacity and drop resistance performance of the Zr-based composite ceramic material of the present disclosure may be better enhanced.

During preparation of the Zr-based composite ceramic material mentioned above of the present disclosure, raw materials include: a zirconia powder, a $SrCO_3$ powder, and a $Nb_2O_5$ powder. In some embodiments, the zirconia powder is a tetragonal phase zirconia powder stabilized with about 3 mol % of yttrium, then the zirconia matrix in the thus formed Zr-based composite ceramic material is a zirconia matrix stabilized with about 3 mol % of yttrium. The $SrCO_3$ powder and the $Nb_2O_5$ powder included in the raw material may be sintered to form the cubic $Sr_xNbO_3$ stable phase within the zirconia matrix.

In the Zr-based composite ceramic material mentioned above of the present disclosure, it is presumed that the $SrCO_3$ (strontium carbonate) powder and the $Nb_2O_5$ (niobium pentoxide) powder may achieve a complete reaction to generate the cubic $Sr_xNbO_3$ stable phase. Therefore, the content of the cubic $Sr_xNbO_3$ stable phase in embodiments of the present disclosure is determined by a feed ratio of the $SrCO_3$ (strontium carbonate) powder to the $Nb_2O_5$ (niobium pentoxide) powder.

It should be noted that there is no particular limitation for particle sizes of the zirconia powder, the $SrCO_3$ powder, and the $Nb_2O_5$ powder, and reference can be made to a conventional selection for particle sizes of the raw material for preparing a ceramic material in the art. For example, the particle size D50 of the zirconia powder may be in a range of about 0.1 microns to about 1 micron, such as about 0.5 microns to about 0.8 microns, and the particle sizes of both the $SrCO_3$ powder and the $Nb_2O_5$ powder may be in a range of about 0.2 microns to about 5 microns. It should be noted that the particle size D50 means a volume average diameter, which may be determined by a particle size measurement with a laser particle analyzer after dispersing a powder to be tested in water, and ultrasonic shaking for about 30 minutes.

During preparation of the Zr-based composite ceramic material mentioned above of the present disclosure, a coloring powder may be introduced to obtain a ceramic material having particular colors, according to consumer's need.

For example, by adding a $ErAlO_3$ powder (in an addition amount of about 0.8 to about 5 mol % based on 100 mol % of zirconia powder), a ceramic material having a pink color may be obtained; by adding a $LaFeO_3$ powder (in an addition amount of about 0.5 to about 9 mol % based on 100 mol % of zirconia powder) and a $LaCrO_3$ powder (in an addition amount of about 0.21 to about 3.86 mol % based on 100 mol % of zirconia powder), a ceramic material having a coffee color may be obtained; by adding a $ErAlO_3$ powder (in an addition amount of about 0.5 to about 9 mol % based on 100 mol % of zirconia powder) and a $FeAlO_3$ powder (in an addition amount of about 0.056 to about 1 mol % based on 100 mol % of zirconia powder), a ceramic material having an apricot color may be obtained; by adding a $CoFe_2O_4$ powder (in an addition amount of about 0.8 to about 5 mol % based on 100 mol % of zirconia powder), a ceramic material having a black color may be obtained; by adding a $La_{0.8}Sr_{0.2}MnO_3$ powder (in an addition amount of about 0.8 to about 5 mol % based on 100 mol % of zirconia powder), a ceramic material having a black color, especially a black grey color may be obtained; by adding a $SrAl_{12}O_{19}$ powder (in an addition amount of about 0.17 to about 0.75 mol % based on 100 mol % of zirconia powder) to coordinate with the cubic $Sr_xNbO_3$ stable phase, a ceramic material having a white color, especially a cold white color may be obtained; and by adding a $Ca_{10}(PO_4)_6(OH)_2$ powder (in an addition amount of about 0.05 to about 1 mol % based on 100 mol % of zirconia powder) and a $SrAl_{12}O_{19}$ powder (in an addition amount of about 0.13 to about 0.83 mol % based on 100 mol % of zirconia powder), a ceramic material having a white color, especially a milk white color may be obtained. In some embodiments, the coloring powder has a particle size D50 of about 0.1 microns to about 2 microns, for example, about 0.2 microns to about 0.7 microns.

The Zr-based composite ceramic material mentioned above of the present disclosure may be manufactured by mixing the zirconia powder and the cubic $Sr_xNbO_3$ stable phase to form a mixture, and then drying, molding and sintering the mixture. The manufacturing method of the Zr-based composite ceramic material mentioned above of the present disclosure may be any common method in the art, as long as the ceramic material obtained includes the cubic $Sr_xNbO_3$ stable phase.

It should be noted that, generally, a powder of the cubic $Sr_xNbO_3$ stable phase (especially the cubic $Sr_{0.82}NbO_3$ stable phase, the cubic $Sr_{0.72}NbO_3$ stable phase, and the cubic $Sr_{0.86}NbO_3$ stable phase) has a relatively high price, which may be not good for wide application of the Zr-based composite ceramic material. Therefore, in the present disclosure, a $SrCO_3$ powder and a $Nb_2O_5$ powder, both having a relatively low price, are adopted at a certain ratio to form the desired cubic $Sr_xNbO_3$ stable phase within the zirconia powder after being sintered.

The present disclosure further provides a method for preparing a Zr-based composite ceramic material. The method includes: preparing a mixed slurry by mixing a zirconia powder, a $SrCO_3$ powder, a $Nb_2O_5$ powder and a binder; and obtaining the Zr-based composite ceramic material by drying, molding and sintering the mixed slurry in sequence, in which a molar ratio of $SrCO_3$ powder to $Nb_2O_5$ powder is 2x:1, where $0.7 \leq x \leq 0.95$.

With this method, by adding $SrCO_3$ powder and $Nb_2O_5$ powder (both of which have a function similar to a sintering aid), a sintering temperature for preparing the Zr-based composite ceramic material may be reduced under the same condition, such that the Zr-based composite ceramic material obtained may have a more compact structure. In addition, a cubic $Sr_xNbO_3$ stable phase obtained by mixing and sintering the $SrCO_3$ powder and the $Nb_2O_5$ powder may effectively improve a tenacity and drop resistance performance of the Zr-based composite ceramic material, such that the Zr-based composite ceramic material may be suitably used to manufacture an appearance part having a large area, such as a shell or a decoration.

It should be noted that there is no particular limitation for a mixing method of these raw materials (namely the zirconia powder, the $SrCO_3$ powder, the $Nb_2O_5$ powder and the binder), any common mixing method in the art may be adopted. In some embodiments, preparing a mixed slurry by mixing a zirconia powder, a $SrCO_3$ powder, a $Nb_2O_5$ powder and a binder includes: preparing a pre-mixture by mixing and milling (for example, ball milling) the zirconia powder, the $SrCO_3$ powder, and the $Nb_2O_5$ powder; and preparing the mixed slurry by mixing and milling (for example, ball milling) the pre-mixture and the binder. By this way, these raw materials may be distributed more evenly in the mixed slurry, which may be good for obtaining a Zr-based composite ceramic material having a better tenacity and drop resistance performance.

It should be noted that there is no particular limitation for a ratio of the zirconia powder, the $SrCO_3$ powder, and the $Nb_2O_5$ powder, as long as the prepared Zr-based composite ceramic material contains the cubic $Sr_xNbO_3$ stable phase, and the drop resistance performance of the Zr-based composite ceramic material may be improved to some extent. In order to optimize a tenacity of the Zr-based composite ceramic material, in some embodiments, a molar ratio of the zirconia powder to the $SrCO_3$ powder is 100:(0.2-8)x, for example, 100:(1-6.1)x.

When the molar ratio of the zirconia powder to the $SrCO_3$ powder is within the range stated above, a content of the cubic $Sr_xNbO_3$ stable phase in the prepared Zr-based composite ceramic material is in a range of about 0.2 mol % to about 8 mol %, such as from about 1 mol % to about 6.1 mol %, based on 100 mol % of zirconia matrix, such that the tenacity and drop resistance performance of the prepared Zr-based composite ceramic material may be better improved.

In some embodiments of the present disclosure, a molar ratio of the $SrCO_3$ powder to the $Nb_2O_5$ powder is 2x:1, where $0.72 \leq x \leq 0.86$. In some embodiments, a cubic $Sr_xNbO_3$ stable phase having a lattice constant of 3.98 to 4.03 Å is formed within the Zr-based composite ceramic material by sintering the $SrCO_3$ powder and the $Nb_2O_5$ powder. In some embodiments, x is 0.72, such that a cubic $Sr_{0.72}NbO_3$ stable phase is formed within the Zr-based composite ceramic material of the present disclosure. In some embodiments, x is 0.82, such that a cubic $Sr_{0.82}NbO_3$ stable phase is formed within the Zr-based composite ceramic material of the present disclosure. In some embodiments, x is 0.86, such that a cubic $Sr_{0.86}NbO_3$ stable phase is formed within the Zr-based composite ceramic material of the present disclosure.

In some embodiments, a molar ratio of the zirconia powder to the $SrCO_3$ powder is selected such that a content of the cubic $Sr_xNbO_3$ stable phase in the prepared Zr-based composite ceramic material is in a range of about 0.2 mol % to about 8 mol %, for example about 1 mol % to about 6.1 mol %, based on 100 mol % of the zirconia, and a feed ratio of the $SrCO_3$ powder to the $Nb_2O_5$ powder is selected according to a molar stoichiometric ratio of elements in the cubic $Sr_xNbO_3$ stable phase.

In an alternative embodiment of the present disclosure, the Zr-based composite ceramic material obtained includes a cubic $Sr_{0.82}NbO_3$ stable phase, in this embodiment, a molar ratio of the zirconia powder to the $SrCO_3$ powder is 100:(0.164-6.56), for example 100:(0.82-5), and a feeding molar ratio of the $SrCO_3$ powder to the $Nb_2O_5$ powder is 1.64:1.

In an alternative embodiment of the present disclosure, the Zr-based composite ceramic material obtained includes a cubic $Sr_{0.72}NbO_3$ stable phase, in this embodiment, a molar ratio of the zirconia powder to the $SrCO_3$ powder is 100:(0.15-5.8), for example 100:(0.72-4.4), and a feeding molar ratio of the $SrCO_3$ powder to the $Nb_2O_5$ powder is 1.44:1.

In an alternative embodiment of the present disclosure, the Zr-based composite ceramic material obtained includes a cubic $Sr_{0.86}NbO_3$ stable phase, in this embodiment, a molar ratio of the zirconia powder to the $SrCO_3$ powder is 100:(0.17-6.9), for example 100:(0.86-5.15), and a feeding molar ratio of the $SrCO_3$ powder to the $Nb_2O_5$ powder is 1.72:1.

It should be noted that there are no particular limitations for both type and amount of the binder, which may be selected according to a conventional technical means in the art. For example, the binder may be, but not limited to, PVA or polyethylene glycol 4000, and the amount of the binder may be 0.2 wt % to about 2 wt % based on a total weight of the zirconia powder.

It should be noted that there are no particular limitations for technological conditions of the drying step, and the drying step may be carried out according to a commonly used drying method in the art. For example, in one embodiment, the drying step is carried out by adopting a spray drying under conditions of: an air inlet temperature of about 220 Celsius degrees to about 260 Celsius degrees, an air outlet temperature of about 100 Celsius degrees to about 125 Celsius degrees, and a centrifugal rotational speed of about 10 rpm to about 20 rpm.

It should be noted that there are no particular limitations for technological conditions of the molding step, and the molding step may be carried out by adopting a dry pressing, an isostatic compaction, an injection molding, a hot pressing casting or other conventional molding methods. For example, in one embodiment of the present disclosure, the molding step is carried out by adopting a dry pressing with a press having a tonnage of about 150 tons to about 200 tons under a dry pressure of about 6 MPa to about 12 MPa for about 20 seconds to about 60 seconds.

It should be noted that there are no particular limitations for technological conditions of the sintering step. In one embodiment, the sintering step is carried out by adopting an air pressure sintering with an ordinary muffle furnace. For example, the sintering step is carried out at a temperature of about 1350 Celsius degrees to about 1500 Celsius degrees, for example, about 1390 Celsius degrees to about 1480 Celsius degrees, such as, about 1430 Celsius degrees to about 1470 Celsius degrees, for about 1 hour to about 2 hours.

It should be noted that, according to preparation or application requirement or consumer's need, other auxiliary materials may be added in the method for preparing the Zr-based composite ceramic material of the present disclosure. For example, according to the market demands, a coloring material may be added so as to obtain a ceramic material having the corresponding colors. Then, the sintering temperature may be properly adjusted according to the added auxiliary materials, which is known by those skilled in the art, and therefore a detailed description thereof is omitted herein.

In some embodiments of the present disclosure, the sintering step includes: heating a preformed part obtained in the molding step from room temperature up to a temperature ranging from about 550 Celsius degrees to about 650 Celsius degrees within about 350 minutes to about 450 minutes, and then holding for about 1.5 hours to about 2.5 hours; raising the temperature up to about 1100 Celsius degrees to about 1200 Celsius degrees within about 250 minutes to about 350 minutes, and then holding for about 1.5 hours to about 2.5 hours; raising the temperature up to about 1250 Celsius degrees to about 1350 Celsius degrees within about 120 minutes to about 180 minutes, and then holding for about 1.5 hours to about 2.5 hours; raising the temperature up to about 1430 Celsius degrees to about 1470 Celsius degrees within about 30 minutes to about 60 minutes, and then holding for about 1 hour to about 2 hours; dropping the temperature to about 900 Celsius degrees within about 120 minutes to about 180 minutes; and then naturally dropping the temperature to room temperature.

It should be noted that there are no particular limitations for milling step, as long as these raw materials may be blended sufficiently. In some embodiments, the milling step is carried out by adopting a ball milling using a ball milling pot with a zirconia ceramic lining and a zirconia mill ball.

It should be noted that, generally, a ball milling liquid should be added during the ball milling. For example, in the present disclosure, the ball milling liquid may be at least one selected from, but not limited to, water and $C_1$-$C_5$ alcohols. In some embodiments, the ball milling liquid is at least one selected from water and $C_1$-$C_5$ monohydric alcohols. The $C_1$-$C_5$ monohydric alcohols may be at least one selected from: methyl alcohol, ethyl alcohol, n-propyl alcohol, 2-propyl alcohol, n-butyl alcohol, 2-butyl alcohol, 2-methyl-1-propyl alcohol, 2-methyl-2-propyl alcohol, n-amyl alcohol, 2-methyl-1-butanol, 3-methyl-1-butanol, 2-methyl-2-butanol, 3-methyl-2-butanol and 2,2-dimethyl-1-propyl alcohol. In some embodiments, the ball milling liquid is selected from at least one of water and ethyl alcohol.

The present disclosure also provides a Zr-based composite ceramic material prepared by the method mentioned above. The Zr-based composite ceramic material includes a zirconia matrix and a cubic $Sr_xNbO_3$ stable phase dispersed within the zirconia matrix, where $0.7 \leq x \leq 0.95$.

In some embodiments, in the cubic $Sr_xNbO_3$ stable phase, $0.72 \leq x \leq 0.86$. In some embodiments, the cubic $Sr_xNbO_3$ stable phase has a lattice constant of 3.98 to 4.03 Å. In some embodiments, the cubic $Sr_xNbO_3$ stable phase is a cubic $Sr_{0.82}NbO_3$ stable phase, a cubic $Sr_{0.72}NbO_3$ stable phase or a cubic $Sr_{0.86}NbO_3$ stable phase. In some embodiments, a content of the cubic $Sr_xNbO_3$ stable phase in the Zr-based composite ceramic material is in a range of about 0.2 mol % to about 8 mol %, for example, about 1 mol % to about 6.1 mol %, based on 100 mol % of the zirconia matrix.

In the method for preparing the Zr-based composite ceramic material of the present disclosure, it is presumed that the $SrCO_3$ (strontium carbonate) powder and the $Nb_2O_5$ (niobium pentoxide) powder may achieve a complete reaction to generate the cubic $Sr_{0.82}NbO_3$ stable phase. Therefore, the content of the cubic $Sr_{0.82}NbO_3$ stable phase in the prepared Zr-based composite ceramic material is determined by a feed ratio of the $SrCO_3$ (strontium carbonate) powder to the $Nb_2O_5$ (niobium pentoxide) powder.

The present disclosure also provides a shell or a decoration, the shell or the decoration is made of the Zr-based composite ceramic material mentioned above and thus may have a relatively good tenacity and drop resistance performance.

The Zr-based composite ceramic material, the method for preparing the Zr-based composite ceramic material of the present disclosure, and advantageous effects thereof will be further described hereinafter by referring to Examples and Comparative Examples.

1. Description of Raw Materials Used in the Examples and Comparative Examples (1) Zirconia powder: OZ-3Y-7 (particle size D50: 0.7 microns) purchased from Guangdong Orient Zirconic Ind Sci&Tech Co., Ltd, which is a tetragonal phase zirconia powder stabilized with about 3 mol % of yttrium.

(2) $SrCO_3$ powder: purchased from Shanghai Dian Yang Industry Co., LTD with a purity of 99% and a particle size D50 of 1 micron.

(3) $Nb_2O_5$ power: purchased from Yangzhou Sanhe Chemical Co., LTD with a purity of 99.5% and a particle size D50 of 1 micron.

(4) Binder: polyethylene glycol 4000 and PVA217 both purchased from Kuraray company.

2. Testifying Examples

In X-ray diffraction phase analysis of the following Testifying Example 1 and Testifying Example 2:

Test Instrument: X-ray diffraction phase analyzer.

Test Conditions: CuKa radiation, pipe voltage: 40 KV, pipe current: 20 mA, scanning pattern: theta/2theta ($\theta/2\theta$), scanning mode: continue, scanning range: 10 degrees to 80 degrees, stepping angle: 0.04 degrees.

Testifying Example 1

This Testifying Example is used to prove that the cubic $Sr_{0.82}NbO_3$ stable phase cannot be obtained by sintering the $Nb_2O_5$ power and the $SrCO_3$ powder in air with a molar ratio of the $Nb_2O_5$ power to the $SrCO_3$ powder of 1:1.64.

Raw materials: $Nb_2O_5$ power and $SrCO_3$ powder, a molar ratio of the $Nb_2O_5$ power to the $SrCO_3$ powder is 1:1.64.

Preparation Process:

The $Nb_2O_5$ power and the $SrCO_3$ powder were ball milled in a ball milling pot for 8 hours with addition of ethyl alcohol to form a mixture, and then the mixture was dried.

The dried mixture was heated up to 600 Celsius degrees from room temperature within 400 minutes, and held for 2 hours; then heated up to 1150 Celsius degrees within 300 minutes, and held for 2 hours; then heated up to 1300 Celsius degrees within 150 minutes, and held for 2 hours, then heated up to 1450 Celsius degrees within 50 minutes, and held for 1.5 hours; then cooled down to 900 Celsius degrees within 150 minutes, and then naturally cooled down to room temperature to obtain a sinter, which was marked as P1.

Result of X-ray diffraction phase analysis: FIG. 1 shows a XRD diffraction pattern of P1 prepared in Testifying Example 1 and standard cards of $SrNb_6O_{16}$ (00-045-0228) and $Sr_2Nb_2O_7$ (01-070-0114). As shown in FIG. 1, the sinter P1 mainly contains the $SrNb_6O_{16}$ phase and the $Sr_2Nb_2O_7$ phase, but without the cubic $Sr_{0.82}NbO_3$ stable phase. That is, the cubic $Sr_{0.82}NbO_3$ stable phase cannot be obtained by sintering the $Nb_2O_5$ power and the $SrCO_3$ powder in air with the molar ratio of the $Nb_2O_5$ power to the $SrCO_3$ powder of 1:1.64.

Testifying Example 2

This Testifying Example is used to prove that the cubic $Sr_{0.82}NbO_3$ stable phase may be obtained by sintering the $Nb_2O_5$ power and the $SrCO_3$ powder in the zirconia matrix with a molar ratio of the $Nb_2O_5$ power to the $SrCO_3$ powder of 1:1.64.

Raw materials: 200 grams of zirconia powder, $Nb_2O_5$ power in an amount of 25 mol % based on the total mole of the zirconia powder, and $SrCO_3$ powder, the molar ratio of the $Nb_2O_5$ power to the $SrCO_3$ powder is 1:1.64.

Preparation Process:

The zirconia powder, the $Nb_2O_5$ power and the $SrCO_3$ powder were ball milled in a ball milling pot for 8 hours with addition of ethyl alcohol to form a mixture, and then the mixture was dried.

The dried mixture was heated up to 600 Celsius degrees from room temperature within 400 minutes, and held for 2 hours; then heated up to 1150 Celsius degrees within 300 minutes, and held for 2 hours; then heated up to 1300 Celsius degrees within 150 minutes, and held for 2 hours, then heated up to 1450 Celsius degrees within 50 minutes, and held for 1.5 hours; then cooled down to 900 Celsius degrees within 150 minutes, and then naturally cooled down to room temperature to obtain a sinter, which was marked as P2.

Figure 2:
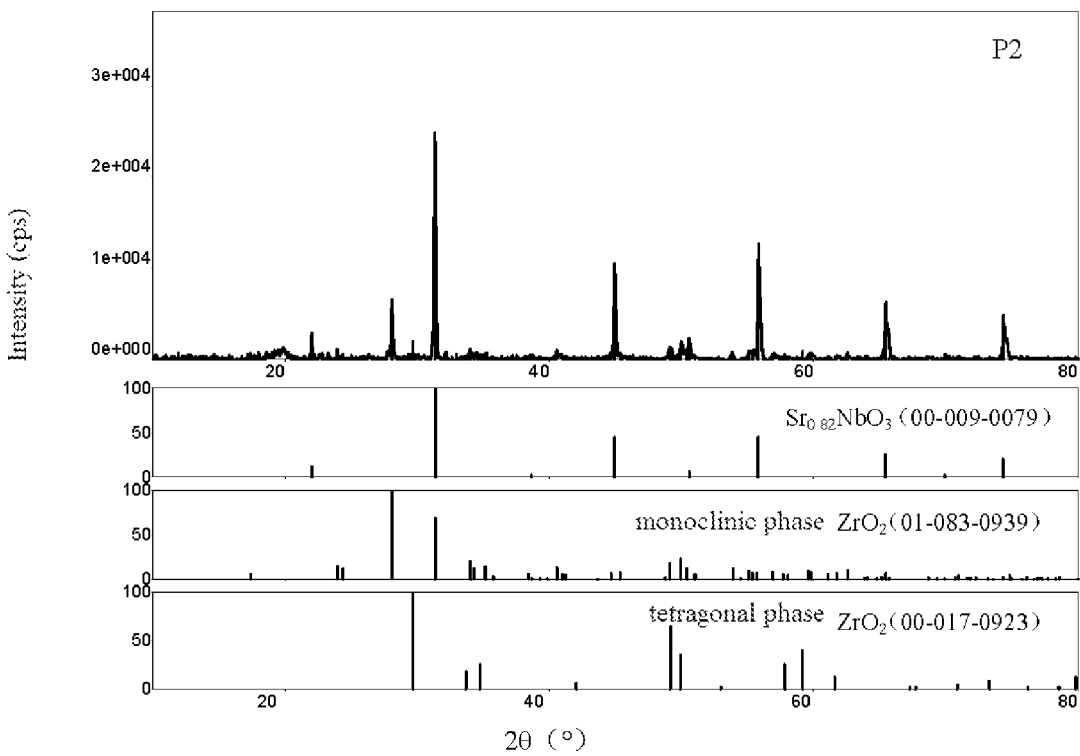
FIG. 2 is a diagram showing a XRD diffraction pattern of P2 prepared in Testifying Example 2 and standard cards of tetragonal phase zirconia (00-017-0923), monoclinic phase zirconia (01-083-0939) and $Sr_{0.82}NbO_3$ (00-009-0079).

Result of X-ray diffraction phase analysis: FIG. 2 shows a XRD diffraction pattern of P2 prepared in Testifying Example 2 and standard cards of tetragonal phase zirconia (00-017-0923), monoclinic phase zirconia (01-083-0939) and $Sr_{0.82}NbO_3$ (00-009-0079). As shown in FIG. 2, the sinter P2 contains the tetragonal phase zirconia, the monoclinic phase zirconia and the cubic $Sr_{0.82}NbO_3$ stable phase. That is, the cubic $Sr_{0.82}NbO_3$ stable phase may be obtained by sintering the $Nb_2O_5$ power and the $SrCO_3$ powder in the zirconia matrix with the molar ratio of the $Nb_2O_5$ power to the $SrCO_3$ powder of 1:1.64.

In conclusion, as can be seen from the results of X-ray diffraction phase analysis of Testifying Example 1 and Testifying Example 2, the cubic $Sr_{0.82}NbO_3$ stable phase may be obtained by mixing the $Nb_2O_5$ power and the $SrCO_3$ powder at a molar ratio of the $Nb_2O_5$ power to the $SrCO_3$ powder of 1:1.64 under certain cases and conditions, instead of any cases and conditions.

Inventors of the present disclosure have occasionally found that the cubic $Sr_{0.82}NbO_3$ stable phase may be obtained by sintering the $Nb_2O_5$ power and the $SrCO_3$ powder mixed in the zirconia matrix with a molar ratio of the $Nb_2O_5$ power to the $SrCO_3$ powder of 1:1.64. Based on this, inventors of the present disclosure provide the Zr-based composite ceramic material and the preparation method thereof in the present disclosure.

In addition, it should be noted that, the cubic $Sr_{0.72}NbO_3$ stable phase and the cubic $Sr_{0.86}NbO_3$ stable phase have a similar preparation process to that of the cubic $Sr_{0.82}NbO_3$ stable phase, and are obtained by sintering the $Nb_2O_5$ power and the $SrCO_3$ powder mixed in the zirconia matrix with a certain molar ratio, which will not be elaborated herein.

Examples 1-6

Examples 1-6 are used to illustrate the Zr-based composite ceramic material of the present disclosure and the preparation method thereof. The Zr-based composite ceramic material includes a zirconia matrix and a cubic $Sr_{0.82}NbO_3$ stable phase dispersed within the zirconia matrix.

Example 1

This example is used to illustrate the Zr-based composite ceramic material of the present disclosure and the preparation method thereof.

Raw material: 200 grams of zirconia powder, $SrCO_3$ powder in an amount of 1.5 mol % based on the total mole of the zirconia powder, $Nb_2O_5$ power with a molar ratio of the $Nb_2O_5$ power to the $SrCO_3$ powder is 1:1.64, polyethylene glycol 4000 in an amount of 0.5 wt % based on the total weight of the zirconia powder, and PVA in an amount of 0.5 wt % based on the total weight of the zirconia powder.

Preparation Process:

The zirconia powder, the $SrCO_3$ powder and the $Nb_2O_5$ power were ball milled in a ball milling pot for 8 hours with addition of ethyl alcohol to obtain a pre-mixture, then the polyethylene glycol 4000 and PVA were added into the pre-mixture and ball milled for 0.5 hours to obtain a slurry.

The slurry was fed into a spray tower and spray dried under conditions of: an air inlet temperature of 250 Celsius degrees, an air outlet temperature of 110 Celsius degrees, and a centrifugal rotational speed of 15 rpm, to form a spherical powder. The spherical powder was fed into a dry press (which has a tonnage of 180 tons and an oil pressure of 8 MPa) and dry pressed for 30 seconds to form a preformed part. The preformed part was heated up to 600 Celsius degrees from room temperature within 400 minutes and held for 2 hours; then heated up to 1150 Celsius degrees within 300 minutes and held for 2 hours; then heated up to 1300 Celsius degrees within 150 minutes and held for 2 hours; then heated up to 1450 Celsius degrees within 50 minutes and held for 1.5 hours; then cooled down to 900 Celsius degrees within 150 minutes; and then naturally cooled down to room temperature to obtain the Zr-based composite ceramic material.

It is presumed according to the feed stoichiometric ratio that, the obtained Zr-based composite ceramic material contains about 1.83 mol % of the cubic $Sr_{0.82}NbO_3$ stable phase (which has a lattice constant of 4.002 Å), based on 100 mol % of the zirconia powder.

The obtained Zr-based composite ceramic material was polished and laser cut into a sample having a length of 135 millimeters, a width of 65 millimeters and a thickness of 0.7 millimeters, and the sample was marked as S1.

Examples 2-6

These examples are used to illustrate the Zr-based composite ceramic material of the present disclosure and the preparation method thereof.

Raw material: the raw materials of Examples 2-6 are the same as Example 1, except that: an amount of the $SrCO_3$ powder was X mol % based on the total mole of the zirconia powder, where X was recorded in Table 1.

TABLE 1

| Example No. | 2 | 3 | 4 | 5 | 6 |
|---|---|---|---|---|---|
| X | 0.82 | 5 | 0.2 | 6.56 | 7.38 |

Preparation Process:
The preparation processes of Examples 2-6 are the same as that of Example 1.

It is presumed according to the feed stoichiometric ratio that, these Zr-based composite ceramic materials obtained in Examples 2-6 contain Y mol % of cubic $Sr_{0.82}NbO_3$ stable phase, based on 100 mol % of the zirconia powder, where values of Y are recorded in Table 2.

TABLE 2

| Example No. | 2 | 3 | 4 | 5 | 6 |
|---|---|---|---|---|---|
| Y | 1 | 6.1 | 0.24 | 8 | 9 |

These Zr-based composite ceramic materials obtained in Example 2-6 were polished and laser cut into samples having a length of 135 millimeters, a width of 65 millimeters and a thickness of 0.7 millimeters, and these samples were marked as S2 to S6, respectively.

Examples 7-12

These examples are used to illustrate the Zr-based composite ceramic material of the present disclosure and the preparation method thereof. The Zr-based composite ceramic material includes a zirconia matrix and a cubic $Sr_{0.72}NbO_3$ stable phase dispersed within the zirconia matrix.

Example 7

This example is used to illustrate the Zr-based composite ceramic material of the present disclosure and the preparation method thereof.

Raw material: the raw materials of Example 7 are the same as Example 1, except that: a molar ratio of the $Nb_2O_5$ power to the $SrCO_3$ powder is 1:1.44.

Preparation Process:

The preparation process of Example 7 is the same as that of Example 1.

It is presumed according to the feeding stoichiometric ratio that, the obtained Zr-based composite ceramic material contains 2.08 mol % of cubic $Sr_{0.72}NbO_3$ stable phase (which has a lattice constant of 3.9865 Å), based on 100 mol % of the zirconia powder.

The obtained Zr-based composite ceramic material was polished and laser cut into a sample having a length of 135 millimeters, a width of 65 millimeters and a thickness of 0.7 millimeters, and the sample was marked as S7.

Examples 8-12

These examples are used to illustrate the Zr-based composite ceramic material of the present disclosure and the preparation method thereof.

Raw material: the raw materials of Examples 8-12 were the same as that of Example 1, except that: an amount of the $SrCO_3$ powder was X mol % based on the total mole of the zirconia powder, and a molar ratio of the $Nb_2O_5$ power to the $SrCO_3$ powder is 1:1.44. Values of X in Examples 8-12 are recorded in Table 3.

TABLE 3

| Example No. | 8 | 9 | 10 | 11 | 12 |
|---|---|---|---|---|---|
| X | 0.72 | 4.4 | 0.15 | 5.8 | 6.5 |

Preparation Process:

The preparation processes of Examples 8-12 are the same as that of Example 1.

It is presumed according to the feed stoichiometric ratio that, these Zr-based composite ceramic materials obtained in Examples 8-12 contain Y mol % of cubic $Sr_{0.72}NbO_3$ stable phase, based on 100 mol % of the zirconia powder, and values of Y in Examples 8-12 are recorded in Table 4.

TABLE 4

| Example No. | 8 | 9 | 10 | 11 | 12 |
|---|---|---|---|---|---|
| Y | 1 | 6.1 | 0.21 | 8.05 | 9.03 |

These Zr-based composite ceramic materials obtained in Example 8-12 were polished and laser cut into samples having a length of 135 millimeters, a width of 65 millimeters and a thickness of 0.7 millimeters, and these samples were marked as S8 to S12, respectively.

Examples 13-18

These examples are used to illustrate the Zr-based composite ceramic material of the present disclosure and the preparation method thereof. The Zr-based composite ceramic material includes a zirconia matrix and a cubic $Sr_{0.86}NbO_3$ stable phase dispersed within the zirconia matrix.

Example 13

This example is used to illustrate the Zr-based composite ceramic material of the present disclosure and the preparation method thereof.

Raw material: the raw materials of Example 13 are the same as that of Example 1, except that: a molar ratio of the $Nb_2O_5$ power to the $SrCO_3$ powder is 1:1.72.

Preparation Process:

The preparation process of Example 13 is the same as that of Example 1.

It is presumed according to the feed stoichiometric ratio that, the obtained Zr-based composite ceramic material contains 1.74 mol % of cubic $Sr_{0.86}NbO_3$ stable phase (which has a lattice constant of 4.006 Å), based on 100 mol % of the zirconia powder.

The obtained Zr-based composite ceramic material was polished and laser cut into a sample having a length of 135 millimeters, a width of 65 millimeters and a thickness of 0.7 millimeters, and the sample was marked as S13.

Examples 14-18

These examples are used to illustrate the Zr-based composite ceramic material of the present disclosure and the preparation method thereof.

Raw material: raw materials of Examples 14-18 are the same as that of Example 1, except that: an amount of the $SrCO_3$ powder was X mol % based on the total mole of the zirconia powder, and a molar ratio of the $Nb_2O_5$ power to the $SrCO_3$ powder was 1:1.72. Values of X in Examples 14-18 are recorded in Table 5.

TABLE 5

| Example No. | 14 | 15 | 16 | 17 | 18 |
|---|---|---|---|---|---|
| X | 0.86 | 5.1 | 0.2 | 6.9 | 8 |

Preparation Process:

The preparation processes of Examples 14-18 are the same as that of Example 1.

It is presumed according to the feed stoichiometric ratio that, these Zr-based composite ceramic materials obtained in Examples 8-12 contain Y mol % of cubic $Sr_{0.86}NbO_3$ stable phase, based on 100 mol % of the zirconia powder, and values of Y of Examples 14-18 are recorded in Table 6.

TABLE 6

| Example No. | 14 | 15 | 16 | 17 | 18 |
|---|---|---|---|---|---|
| Y | 1 | 5.9 | 0.23 | 8 | 9.3 |

These Zr-based composite ceramic materials obtained in Example 14-18 were polished and laser cut into samples having a length of 135 millimeters, a width of 65 millimeters and a thickness of 0.7 millimeters, and these samples were marked as S14 to S18, respectively.

Comparative Example 1

This Comparative Example 1 is used to comparatively illustrate the Zr-based composite ceramic material of the present disclosure and the preparation method thereof.

(1) Raw material: 200 grams of zirconia powder, polyethylene glycol 4000 in an amount of 0.5 wt % based on the total weight of the zirconia powder, and PVA in an amount of 0.5 wt % based on the total weight of the zirconia powder.

(2) Preparation process of ceramic material:

The zirconia powder, polyethylene glycol 4000 and PVA were ball milled for 0.5 hours to obtain a slurry.

The slurry was fed into a spray tower and spray dried under conditions of: an air inlet temperature of 250 Celsius degrees, an air outlet temperature of 110 Celsius degrees, and a centrifugal rotational speed of 15 rpm, to form a spherical powder. The spherical powder was fed into a dry press (which has a tonnage of 180 tons and an oil pressure of 8 MPa) and dry pressed for 30 seconds to form a preformed part. The preformed part was heated up to 1480 Celsius degrees and sintered for 2 hours, and then cooled down to room temperature to obtain a Zr-based ceramic material.

The obtained Zr-based ceramic material was polished and laser cut into a sample having a length of 135 millimeters, a width of 65 millimeters and a thickness of 0.7 millimeters, and the sample was marked as D1.

Comparative Example 2

This Comparative Example 2 (referring to Example 1 in Chinese Patent No. 02111146.4) is used to comparatively illustrate the Zr-based composite ceramic material of the present disclosure and the preparation method thereof.

0.5 vol % of ultra-fine YAS sintering aid and (Mg, Y)-TZP powder (((14 mol %)MgO-(1.5 mol %)$Y_2O_3$-(balance)$ZrO_2$) were mechanically ball milled for about 12 hours, and then dried. After that, a PVA binder having a concentration of 3% was added to form a mixture, which was pelleted and dry pressed under a pressure of 60 MPa, and then isostatic pressed under a pressure of 200 MPa to obtain a biscuit. Subsequently, the biscuit was placed into a silicon molybdenum furnace and heated up to 1400 Celsius degrees at a heating rate of 2 Celsius degrees per minute and held for 2 hours, and then naturally cooled in the furnace to obtain a sinter.

The sinter was polished and laser cut into a sample having a length of 135 millimeters, a width of 65 millimeters and a thickness of 0.7 millimeters, and the sample was marked as D2.

Comparative Example 3

This Comparative Example 3 is used to comparatively illustrate the Zr-based composite ceramic material of the present disclosure and the preparation method thereof.

(1) Raw material: 200 grams of zirconia powder, $Sr_2Nb_2O_7$ powder in an amount of 1.83 mol % based on the total mole of the zirconia powder, polyethylene glycol 4000 in an amount of 0.5 wt % based on the total weight of the zirconia powder, and PVA in an amount of 0.5 wt % based on the total weight of the zirconia powder.

The $Sr_2Nb_2O_7$ powder was obtained by ball-milling mixing the $SrCO_3$ powder and the $Nb_2O_5$ powder at a molar ratio of the $SrCO_3$ powder to the $Nb_2O_5$ powder of 2:1 to form a mixture, then subjecting the mixture to drying and followed by sintering at 1200 Celsius degrees for 1.5 hours to form a sinter, and then milling and crushing the sinter to obtain a powder having a particle size D50 of 0.5 microns.

(2) Preparation process of ceramic material:

The preparation process is the same as that of Comparative Example 1, except that: a pre-mixture was firstly formed by ball milling the zirconia powder and the $Sr_2Nb_2O_7$ powder in a ball milling pot for 8 hours with addition of ethyl alcohol, then a slurry was formed by adding the binder polyethylene glycol 4000 and PVA into the pre-mixture and subsequently performing a ball milling for 0.5 hours.

The obtained Zr-based ceramic material was polished and laser cut into a sample having a length of 135 millimeters, a width of 65 millimeters and a thickness of 0.7 millimeters, and the sample was marked as D3.

3. Test

Performance tests were carried out for samples S1-S18 prepared respectively in Examples 1-18 and samples D1-D3 prepared respectively in Comparative Examples so as to explain advantageous effects of the Zr-based composite ceramic material of the present disclosure and the preparation method thereof.

(1) Test Items and Methods (a) Tenacity test was performed according to GB/T23806 precision ceramics fracture toughness test method, namely single edge notched beam method.

(b) Drop resistance performance test: Ten samples for each of Examples 1-18 and Comparative Examples 1-3 were dropped from a height of 1.3 meters in a free fall manner with their large surfaces being in vertical contact with the ground, and an average anti-drop count was recorded.

(c) Polishing effect: samples S1-S18 and D1-D3 were observed through naked-eye to see if there was any defect on their surface.

(2) Test Result: As Shown in Table 7.

TABLE 7

| Sample | Tenacity (MPa·$m^{1/2}$) | Drop resistance (Count) | Polishing effect |
|---|---|---|---|
| S1 | 16.5 | 20 | mirror surface with no defect |
| S2 | 16 | 18 | mirror surface with no defect |
| S3 | 14 | 13 | mirror surface with no defect |
| S4 | 8 | 6 | mirror surface with a few micropores |
| S5 | 9 | 6 | mirror surface with a few micropores |
| S6 | 8 | 4 | mirror surface with a few micropores |
| S7 | 16 | 18 | mirror surface with no defect |
| S8 | 15 | 14 | mirror surface with no defect |
| S9 | 13 | 12 | mirror surface with no defect |
| S10 | 9 | 6 | mirror surface with no defect |
| S11 | 9 | 8 | mirror surface with a few micropores |
| S12 | 8 | 4 | mirror surface with a few micropores |
| S13 | 16.5 | 18 | mirror surface with no defect |
| S14 | 14 | 13 | mirror surface with no defect |
| S15 | 12 | 10 | mirror surface with no defect |
| S16 | 8 | 7 | mirror surface with no defect |
| S17 | 9 | 8 | mirror surface with a few micropores |
| S18 | 7 | 3 | mirror surface with a few micropores |
| D1 | 5.5 | 1 | mirror surface with no defect |
| D2 | 7 | 2 | mirror surface with a few micropores |
| D3 | 10 | 9 | mirror surface with no defect |

As can be seen from Table 7, samples S1-S18 prepared according to the method for preparing the Zr-based composite ceramic materials of the present disclosure have a tenacity significantly better than that of samples D1-D2, and can withstand drop resistance performance test 3 times, even 10 to 20 times at a particular condition.

In addition, samples S1-S4 (which contain the cubic $Sr_{0.82}NbO_3$ stable phase), S7-S10 (which contain the cubic $Sr_{0.72}NbO_3$ stable phase), and S13-S16 (which contain the cubic $Sr_{0.86}NbO_3$ stable phase) respectively prepared in Examples 1-4, 7-10, and 13-16 of the present disclosure have a much better tenacity and drop resistance performance as compared to the sample D3 prepared in Comparative Example 3 with addition of $Sr_2Nb_2O_7$ powder.

Although embodiments of the present disclosure have been shown and described, those ordinary skilled in the art can understand that multiple changes, modifications, replacements, and variations may be made to these embodiments without departing from the principle and purpose of the present disclosure.

It should be noted that, specific technical characteristics and embodiments described hereinbefore can be combined in any suitable way without contradiction and departing from the principle of the present disclosure, which also falls into the scope of the present disclosure.

The invention claimed is:

1. A Zr-based composite ceramic material, comprising:
   a zirconia matrix; and
   a cubic $Sr_xNbO_3$ stable phase dispersed within the zirconia matrix, where $0.7 \leq x \leq 0.95$.

2. The Zr-based composite ceramic material of claim 1, wherein $0.72 \leq x \leq 0.86$.

3. The Zr-based composite ceramic material of claim 1, wherein the cubic $Sr_xNbO_3$ stable phase has a lattice constant of 3.98 to 4.03 Å.

4. The Zr-based composite ceramic material of claim 1, wherein the cubic $Sr_xNbO_3$ stable phase is a cubic $Sr_{0.82}NbO_3$ stable phase, a cubic $Sr_{0.72}NbO_3$ stable phase, or a cubic $Sr_{0.86}NbO_3$ stable phase.

5. The Zr-based composite ceramic material of claim 1, wherein a content of the cubic $Sr_xNbO_3$ stable phase in the Zr-based composite ceramic material is in a range of about 0.2 mol % to about 8 mol %, based on 100 mol % of the zirconia matrix.

6. The Zr-based composite ceramic material of claim 1, wherein a content of the cubic $Sr_xNbO_3$ stable phase in the Zr-based composite ceramic material is in a range of about 1 mol % to about 6.1 mol %, based on 100 mol % of the zirconia matrix.

7. The Zr-based composite ceramic material of claim 1, wherein the zirconia matrix is a zirconia matrix stabilized with about 3 mol % of yttrium.

8. The Zr-based composite ceramic material of claim 1, wherein the cubic $Sr_xNbO_3$ stable phase is formed by sintering $SrCO_3$ powder and $Nb_2O_5$ powder added during preparation of the Zr-based composite ceramic material.

9. A method for preparing a Zr-based composite ceramic material, comprising:
   preparing a mixed slurry by mixing a zirconia powder, a $SrCO_3$ powder, a $Nb_2O_5$ powder and a binder; and
   obtaining the Zr-based composite ceramic material by drying, molding and sintering the mixed slurry in sequence;
   wherein a molar ratio of the $SrCO_3$ powder to the $Nb_2O_5$ powder is 2x:1, where $0.7 \leq x \leq 0.95$.

10. The method of claim 9, wherein preparing a mixed slurry by mixing a zirconia powder, a $SrCO_3$ powder, a $Nb_2O_5$ powder and a binder comprises:
    preparing a pre-mixture by mixing and milling the zirconia powder, the $SrCO_3$ powder, and the $Nb_2O_5$ powder; and
    preparing the mixed slurry by mixing and milling the pre-mixture and the binder.

11. The method of claim 9, wherein a molar ratio of the zirconia powder to the $SrCO_3$ powder is 100:(0.2-8)x.

12. The method of claim 11, wherein the molar ratio of the zirconia powder to the $SrCO_3$ powder is 100:(1-6.1)x.

13. The method of claim 9, wherein the molar ratio of the $SrCO_3$ powder to the $Nb_2O_5$ powder is 2x:1, where $0.72 \leq x \leq 0.86$.

14. The method of claim 13, wherein a cubic $Sr_xNbO_3$ stable phase is formed within the Zr-based composite ceramic material by sintering the $SrCO_3$ powder and the $Nb_2O_5$ powder, wherein the cubic $Sr_xNbO_3$ stable phase has a lattice constant of 3.98 to 4.03 Å.

15. The method of claim 13, wherein x is 0.72, 0.82 or 0.86.

16. The method of claim 9, wherein the drying step is carried out by a spray drying under conditions of: an air inlet temperature of about 220 Celsius degrees to about 260 Celsius degrees, an air outlet temperature of about 100 Celsius degrees to about 125 Celsius degrees, and a centrifugal rotational speed of about 10 rpm to about 20 rpm.

17. The method of claim 9, wherein the molding step is carried out by adopting a dry pressing with a press having a tonnage of about 150 tons to about 200 tons under a dry pressure of about 6 MPa to about 12 MPa for about 20 seconds to about 60 seconds.

18. The method of claim 9, wherein the sintering step is carried out at a temperature of about 1350 Celsius degrees to about 1500 Celsius degrees for about 1 hour to about 2 hours.

19. The method of claim 9, wherein the sintering step comprises:
    heating a preformed part obtained in the molding step from room temperature up to a temperature ranging from about 550 Celsius degrees to about 650 Celsius degrees in about 350 minutes to about 450 minutes, and then holding for about 1.5 hours to about 2.5 hours;
    raising the temperature up to about 1100 Celsius degrees to about 1200 Celsius degrees in about 250 minutes to about 350 minutes, and then holding for about 1.5 hours to about 2.5 hours;
    raising the temperature up to about 1250 Celsius degrees to about 1350 Celsius degrees in about 120 minutes to about 180 minutes, and then holding for about 1.5 hours to about 2.5 hours;
    raising the temperature up to about 1430 Celsius degrees to about 1470 Celsius degrees in about 30 minutes to about 60 minutes, and then holding for about 1 hour to about 2 hours;
    dropping the temperature to about 900 Celsius degrees in about 120 minutes to about 180 minutes; and
    naturally dropping the temperature to room temperature.

20. The method of claim 19, wherein the sintering step comprises:
    heating the preformed part obtained in the molding step from room temperature up to a temperature of about 600 Celsius degrees in about 400 minutes, and then holding for about 2 hours;
    raising the temperature up to about 1150 Celsius degrees in about 300 minutes, and then holding for about 2 hours;
    raising the temperature up to about 1300 Celsius degrees in about 150 minutes, and then holding for about 2 hours;
    raising the temperature up to about 1450 Celsius degrees in about 50 minutes, and then holding for about 1.5 hours;
    dropping the temperature to about 900 Celsius degrees in about 150 minutes; and
    naturally dropping the temperature to room temperature.

* * * * *